United States Patent
Adams

(10) Patent No.: US 8,087,394 B2
(45) Date of Patent: Jan. 3, 2012

(54) DUAL-LEVEL COMBUSTION CHAMBER SYSTEM, FOR FASTENER DRIVING TOOL, HAVING DUAL-LEVEL ROTARY VALVE MECHANISM INCORPORATED THEREIN

(75) Inventor: Joseph S. Adams, Salt Spring Island (CA)

(73) Assignee: Illinois Tool Works Inc., Glenview, IL (US)

( * ) Notice: Subject to any disclaimer, the term of this patent is extended or adjusted under 35 U.S.C. 154(b) by 844 days.

(21) Appl. No.: 12/149,321

(22) Filed: Apr. 30, 2008

(65) Prior Publication Data

US 2009/0025673 A1     Jan. 29, 2009

Related U.S. Application Data

(60) Provisional application No. 60/935,066, filed on Jul. 25, 2007.

(51) Int. Cl.
*F01L 7/00* (2006.01)
*F02B 71/00* (2006.01)

(52) U.S. Cl. ............... 123/190.4; 123/46 SC; 123/253; 123/46 H

(58) Field of Classification Search ........... 123/46 SC, 123/190.4, 253
See application file for complete search history.

(56) References Cited

U.S. PATENT DOCUMENTS

| | | | |
|---|---|---|---|
| 4,365,471 A | 12/1982 | Adams | |
| 4,510,748 A | 4/1985 | Adams | |
| 4,665,868 A | 5/1987 | Adams | |
| 4,759,318 A * | 7/1988 | Adams | 123/46 SC |
| 4,773,581 A * | 9/1988 | Ohtsu et al. | 227/10 |
| 4,905,634 A | 3/1990 | Veldman | |
| 4,913,331 A * | 4/1990 | Utsumi et al. | 227/10 |
| 5,181,495 A * | 1/1993 | Gschwend et al. | 123/46 SC |
| 5,213,247 A | 5/1993 | Gschwend et al. | |
| 5,752,643 A | 5/1998 | MacVicar et al. | |
| 6,213,370 B1 * | 4/2001 | Walter | 227/8 |
| 6,491,015 B1 * | 12/2002 | Thieleke et al. | 123/260 |
| 6,755,159 B1 * | 6/2004 | Adams et al. | 123/46 R |
| 6,840,033 B2 * | 1/2005 | Adams | 60/39.6 |
| 6,912,988 B2 * | 7/2005 | Adams | 123/256 |
| 6,997,145 B2 * | 2/2006 | Adams | 123/46 R |
| 7,484,648 B2 * | 2/2009 | Gschwend et al. | 227/10 |
| 2003/0110758 A1 | 6/2003 | Adams | |
| 2004/0144357 A1 | 7/2004 | Adams | |

* cited by examiner

*Primary Examiner* — Noah Kamen
*Assistant Examiner* — Grant Moubry
(74) *Attorney, Agent, or Firm* — Law Offices of Steven W. Weinrieb

(57) ABSTRACT

A combustion chamber system, for use in connection with internal combustion powered fastener-driving tools, comprises a dual-level combustion chamber comprising first and second pre-combustion and main combustion chambers, and a dual-level rotary valve mechanism which is operatively connected to the dual-level combustion chamber so as to control the intake of the air/fuel mixture as well as the scavenging or purging of the exhaust gases or combustion products. The first and second pre-combustion and main combustion chambers are also separated by a plate having a plurality of apertures defined therein whereby multiple jets or flame fronts are defined throughout the combustion chamber system.

18 Claims, 4 Drawing Sheets

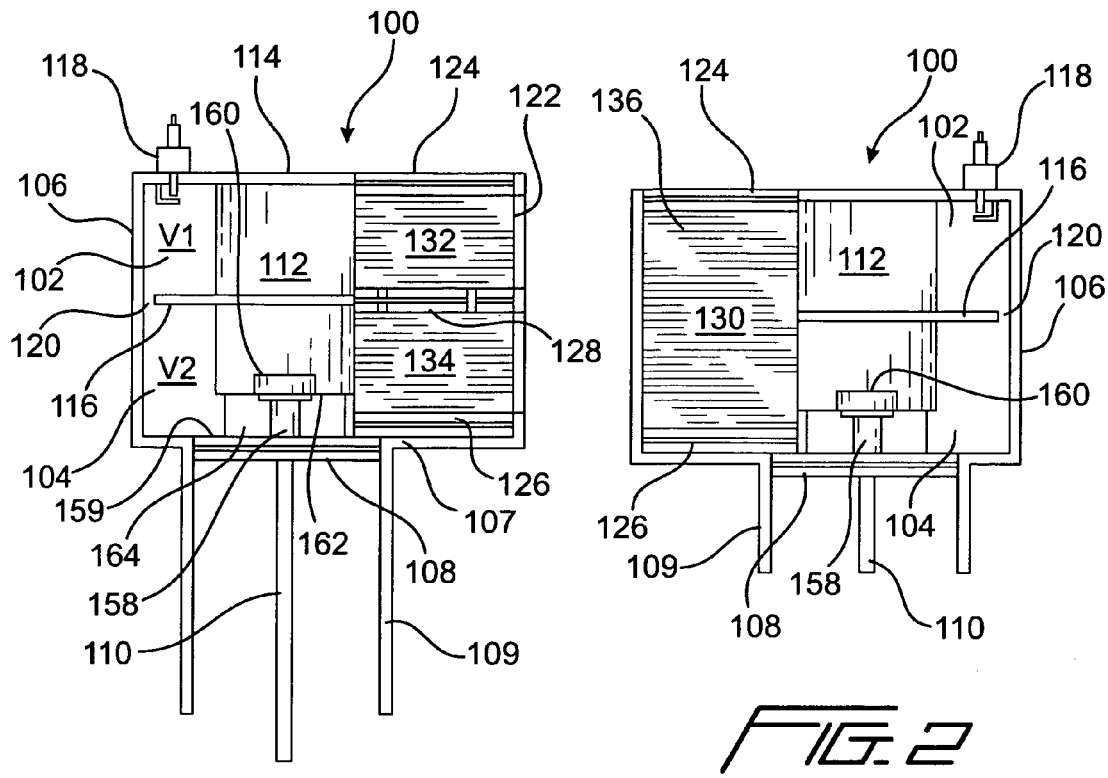
FIG. 1
FIG. 2
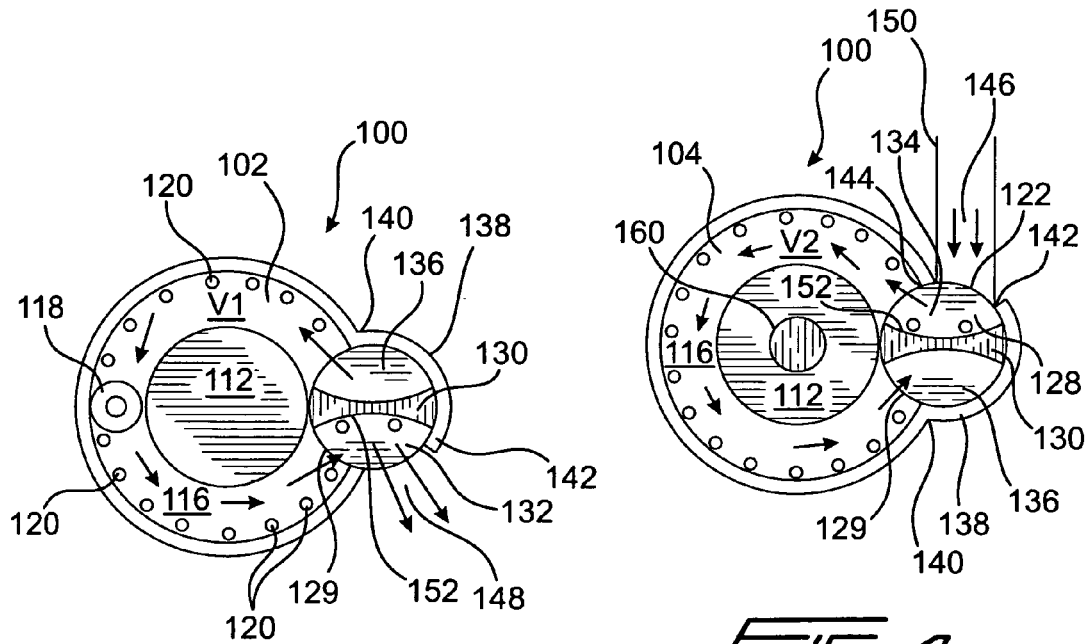
FIG. 3
FIG. 4

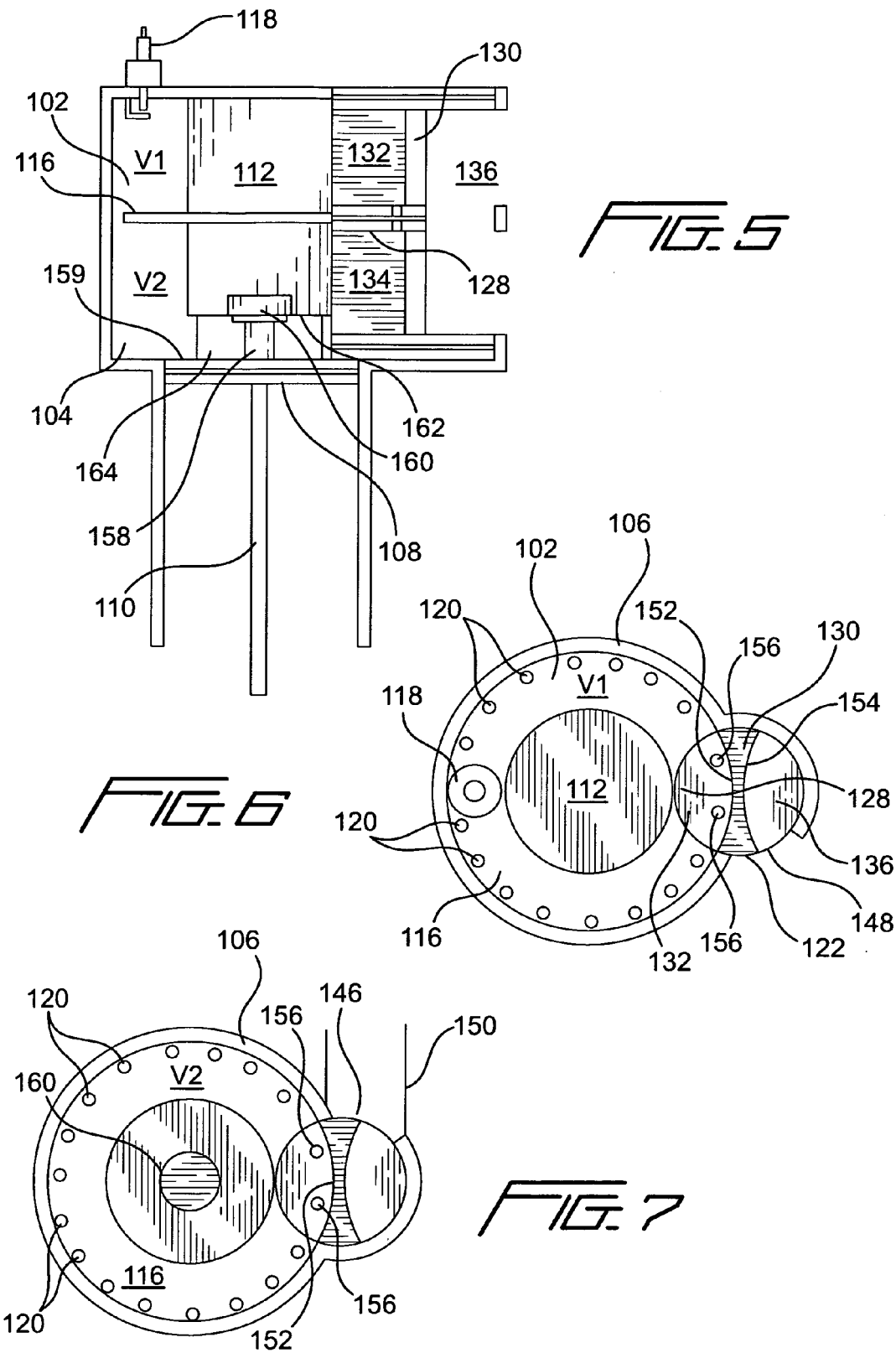

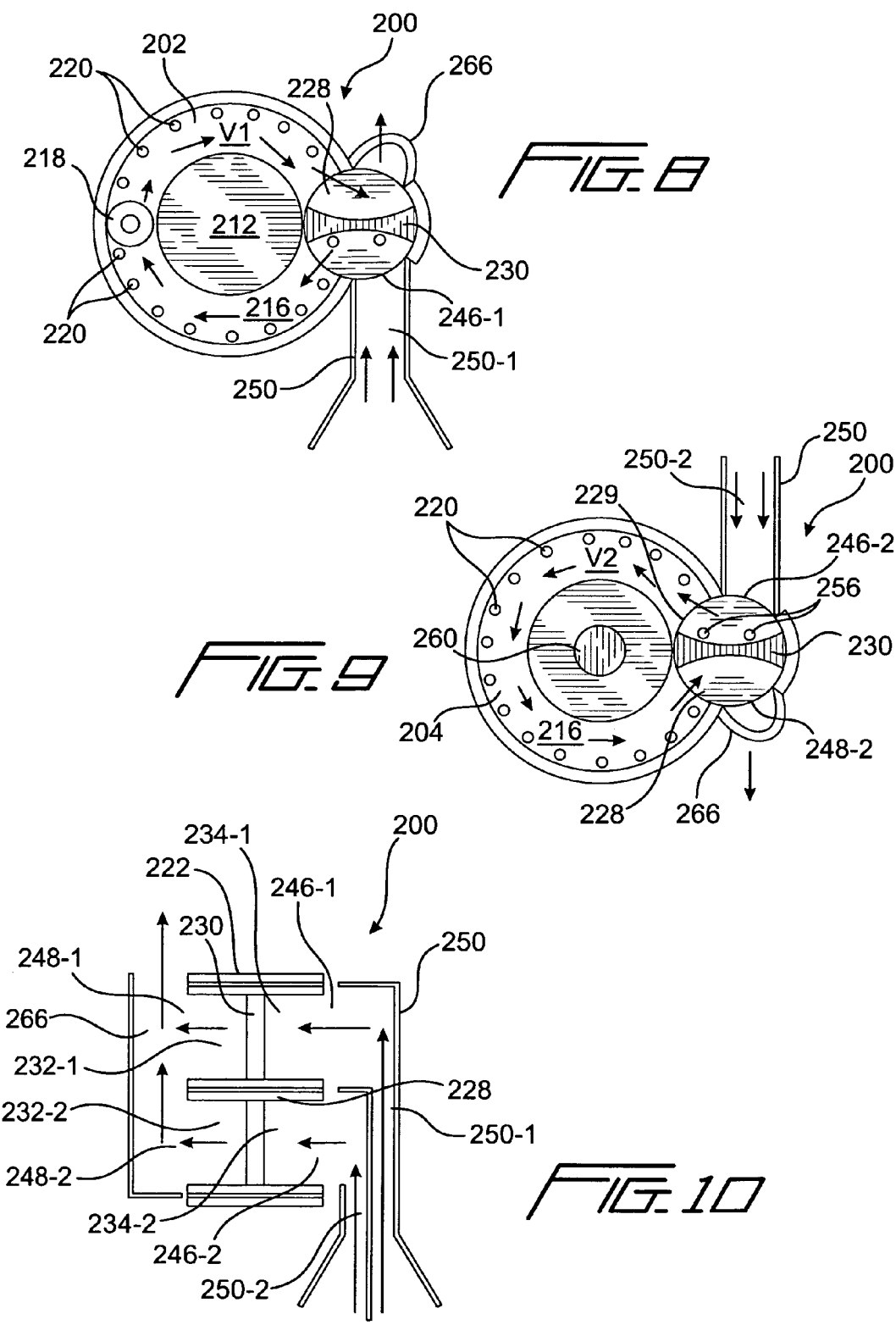

DUAL-LEVEL COMBUSTION CHAMBER SYSTEM, FOR FASTENER DRIVING TOOL, HAVING DUAL-LEVEL ROTARY VALVE MECHANISM INCORPORATED THEREIN

CROSS-REFERENCE TO RELATED PATENT APPLICATION

This patent application is related to, based upon, and effectively a utility patent application conversion from U.S. Provisional Patent Application Ser. No. 60/935,066, which was filed on Jul. 25, 2007, the filing date benefits of which are hereby incorporated by reference.

FIELD OF THE INVENTION

The present invention relates generally to combustion chamber systems having a valve mechanism incorporated therein so as to control the intake of air/fuel mixtures into the combustion chamber, and the exhaust, scavenging, or purging of the exhaust gases or combustion products out from the combustion chamber, and more particularly to a dual-level rotary valve mechanism, disposed within a dual-level combustion chamber comprising first and second combustion chambers which are fluidically connected together, wherein the dual-level rotary valve mechanism not only controls the introduction of the air/fuel mixture into both of the two combustion chambers of the power tool, as well as the exhaust, scavenging, or purging of the exhaust gases or combustion products out from both of the combustion chambers of the power tool, but in addition, the structural configuration of the dual-level rotary valve mechanism, in conjunction with the internal structure comprising the dual-level combustion chamber of the power tool, causes elongated, curved or arcuate flow paths to be defined or formed internally within the dual-level combustion chamber of the power tool so as to enhance or improve the mixing together of the air and fuel mixture components, the distribution of the air/fuel mixture within and throughout the combustion chambers of the power tool, the actual combustion of the air/fuel mixture within and throughout the combustion chambers of the power tool, and the scavenging or purging characteristics of the combustion chamber system of the power tool.

BACKGROUND OF THE INVENTION

Portable, internal combustion powered tools, having various different means for respectively conducting or charging combustible fuels into their combustion chambers, and for exhausting combustion products out from their combustion chambers, are of course well-known in the industry. Examples of such portable, internal combustion powered tools are disclosed within U.S. Pat. No. 6,912,988 which issued to Adams on Jul. 5, 2005, U.S. Pat. No. 6,840,033 which issued to Adams on Jan. 11, 2005, U.S. Pat. No. 5,752,643 which issued to MacVicar et al. on May 19, 1998, U.S. Pat. No. 4,905,634 which issued to Veldman on Mar. 6, 1990, U.S. Pat. No. 4,759,318 which issued to Adams on Jul. 26, 1988, U.S. Pat. No. 4,665,868 which issued to Adams on May 19, 1987, U.S. Pat. No. 4,510,748 which issued to Adams on Apr. 16, 1985, and U.S. Pat. No. 4,365,471 which issued to Adams on Dec. 28, 1982. While the portable, internal combustion powered tools, disclosed within such aforenoted patents, are operationally satisfactory, it is desired to provide such portable, internal combustion powered tools with combustion chambers which are characterized by improved internal structural features that will, for example, enhance the mixing together of the air and fuel mixture components being introduced into the combustion chambers of the internal combustion powered tools, that will enhance the flow distribution of the air/fuel mixtures within and throughout the combustion chambers of the internal combustion powered tools, that will enhance the actual combustion of the air/fuel mixtures within and through-out the combustion chambers of the internal combustion powered tools, and that will enhance the efficiency of the exhausting, scavenging, or purging of the combustion products out from the combustion chambers of the internal combustion powered tools.

As has been noted, for example, within the aforenoted U.S. Pat. No. 6,912,988 which issued to Adams on Jul. 5, 2005, it is desirable to reduce the time period within which the entire combustion cycle is achieved, wherein the combustion cycle is defined between the time at which spark ignition occurs, when the peak pressure from the combustion of the air/fuel mixture within the combustion chamber is obtained so as to drive a power piston in order to drive a fastener through the power tool, in order to discharge the fastener out from the power tool, and to insert or imbed the fastener into a substrate, and when the exhausting, scavenging, or purging of the combustion products out from the combustion chamber of the power tool is completed. More particularly, it is desirable to achieve rapid combustion of the air/fuel mixture within the combustion chamber of a power tool in order to facilitate a faster operation of the power tool as defined between the time when the operator pulls the trigger and when the fastener is driven through the power tool, discharged from the power tool, and inserted or embedded into a substrate. Reduction of the time period, within which the combustion process is achieved, also facilitates the development of peak combustion pressures within the combustion chamber whereby such peak pressures will impact the power piston so as to achieve high velocity movement of the power piston in order to successively drive the fastener through the power tool, to discharge the fastener out from the power tool, and to insert or embed the fastener into a substrate.

One way of achieving higher burn rates or more rapid combustion of the air/fuel mixture within the combustion chamber of an internal combustion powered tool is to induce turbulence of the air/fuel mixture within and throughout the combustion chamber. Such turbulence is known to not only effectively shorten the time period at which peak pressures are obtained subsequent to ignition, but in addition, to enhance or boost the peak pressures of the combusted air/fuel mixtures. In addition, higher peak combustion pressures can also be achieved from the combustion of a predetermined amount of fuel, mixed with air at a predetermined stoichiometric ratio, and at a predetermined compression ratio, by effectively lengthening the combustion chamber as a result of dividing the combustion chamber into a pre-combustion chamber and a main combustion chamber, and subsequently igniting the air-fuel mixtures, disposed within the pre-combustion and main combustion chambers, in sequence. For example, a spark igniter is conventionally located at one end of the pre-combustion chamber which is remote from the main combustion chamber, and subsequently, the spark igniter ignites the air/fuel mixture present within the pre-combustion chamber. A flame front, which is formed at the end of the pre-combustion chamber that is located remote from the main combustion chamber, propagates toward the main combustion chamber, and pushes a portion of the air/fuel mixture, disposed within the pre-combustion chamber, into the main combustion chamber in advance of the arrival of the flame front from the pre-combustion chamber into the main combustion chamber. Both turbulence and increased pressure are created within the air/fuel mixture disposed within the main combustion chamber wherein the air/fuel mixture, disposed within the main combustion chamber, is subsequently ignited upon arrival of the flame front into the main combustion chamber.

As has been further noted, for example, within the aforenoted U.S. Pat. No. 6,840,033 which issued to Adams on Jan. 11, 2005, the use of curved pre-combustion chambers is believed to increase flame-front propagation speed and to shorten the time required to achieve peak combustion pressure subsequent to ignition, as compared to the use of linear or straight pre-combustion chambers having the same or similar cross-sectional dimensions. It is also to be appreciated, however, that peak combustion pressure is a function of the volume of the air/fuel mixture within the combustion chamber, and accordingly, combustion chambers characterized by increased length dimensions, which obviously increase the overall volume of the combustion chambers, can adversely affect the development of the peak combustion pressure in that the flame fronts must traverse greater combustion chamber lengths in order to develop the desired peak combustion pressures. Still yet further, combustion efficiency is also a function of, or depends upon, the quality of the air/fuel mixture disposed within the combustion chamber. Between each firing cycle, exhaust gases or combustion products must be removed from the combustion chamber and a fresh charge of the air/fuel mixture must be introduced into the combustion chamber. It is therefore imperative to remove as much of the exhaust gases or combustion products, generated during the previous tool firing cycle, as is possible in order to degrade the incoming fresh charge of the air fuel mixture as little as possible whereby the new or fresh incoming air/fuel mixture, in preparation for the new or subsequent tool firing cycle, will be characterized by means of the highest possible quality.

A need therefore exists in the art for a new and improved combustion chamber system, for use within an internal combustion powered fastener-driving tool, wherein the combustion chamber system would be able to provide good mixing or turbulence characteristics in connection with the air/fuel mixture charged into and distributed throughout the combustion chamber system, wherein, despite the fact that the combustion chamber system would provide or define a combustion chamber characterized by relatively large length dimensions, the combustion chamber system would also be characterized by increased air/fuel mixture distribution and ignition efficiency by effectively causing the air/fuel mixture to be divided into multiple flame fronts which only need to traverse relatively shortened distances before complete combustion, and the development of peak combustion pressures, occur so as to achieve high velocity movement of the power piston which is adapted to impact upon the fastener to be driven through and discharged from the power tool, and wherein the combustion chamber system would be characterized by enhanced exhaust gas or combustion product scavenging or purging techniques in order to enhance the quality of a new or fresh air/fuel mixture charged into the combustion chamber.

SUMMARY OF THE INVENTION

The foregoing and other objectives are achieved in accordance with the teachings and principles of the present invention through the provision of a new and improved combustion chamber system, for use in connection with internal combustion powered fastener-driving tools, which comprises a dual-level combustion chamber comprising first and second pre-combustion and main combustion chambers which are fluidically connected together, and a dual-level rotary valve mechanism which is operatively connected to the dual-level combustion chamber so as to respectively control the intake of the air-fuel mixture into one or both of the first and second pre-combustion and main combustion chambers, and the scavenging or purging of the exhaust gases or combustion products from one or both of the first and second pre-combustion and main combustion chambers. The structural configuration of the dual-level rotary valve mechanism, in conjunction with the internal structure comprising the dual-level combustion chamber of the power tool, causes elongated, curved or arcuate flow paths to be defined or formed internally within the dual-level combustion chamber of the power tool, and the first and second pre-combustion and main combustion chambers of the combustion chamber system are also effectively separated by means of a plate having a plurality of apertures defined therein. In this manner, multiple jets or flame fronts are effectively defined within a circumferential manner through-out the combustion chamber system of the present invention.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 1 is a schematic front elevational view of a first embodiment of a new and improved dual-level combustion chamber system, as constructed in accordance with the principles and teachings of the present invention and comprising first and second pre-combustion and main combustion chambers, for use within, for example, an internal combustion powered fastener driving tool, and having a first embodiment of a new and improved dual-level rotary valve mechanism incorporated therein, illustrated at its OPEN position, for controlling the intake of an air-fuel mixture into a first one of the first and second pre-combustion and main combustion chambers of the dual-level combustion chamber system, and the discharge of exhaust gases or combustion products out from the second one of the first and second pre-combustion and main combustion chambers of the dual-level combustion chamber system;

FIG. 2 is a schematic rear elevational view, corresponding to the schematic front elevational view of FIG. 1, of the new and improved dual-level combustion chamber system, having the new and improved dual-level rotary valve mechanism incorporated therein;

FIG. 3 is a schematic top plan view, corresponding to the schematic front and rear elevational views of FIGS. 1 and 2, of the new and improved dual-level combustion chamber system, showing the new and improved dual-level rotary valve mechanism at its OPEN position with respect to the first upper pre-combustion chamber;

FIG. 4 is a schematic bottom plan view, corresponding to the schematic front and rear elevational views of FIGS. 1 and 2, of the new and improved dual-level combustion chamber system, showing the new and improved dual-level rotary valve mechanism at its OPEN position with respect to the second lower main combustion chamber;

FIG. 5 is a schematic front elevational view, corresponding to the schematic front elevational view of FIG. 1, showing the first embodiment of the new and improved dual-level combustion chamber system, having the new and improved dual-level rotary valve mechanism incorporated therein, wherein, however, the dual-level rotary valve mechanism is illustrated at its CLOSED position;

FIG. 6 is a schematic top plan view, corresponding to the schematic front elevational view of FIG. 5, of the new and improved dual-level combustion chamber system, showing the new and improved dual-level rotary valve mechanism disposed at its CLOSED position;

FIG. 7 is a schematic bottom plan view, corresponding to the schematic front elevational view of FIG. 5, of the new and improved dual-level combustion chamber system, showing the new and improved dual-level rotary valve mechanism disposed at its CLOSED position;

FIG. 8 is a schematic top plan view, similar to that of FIG. 3, showing, however, a second embodiment of a new and improved dual-level combustion chamber system, as constructed in accordance with the principles and teachings of the present invention, comprising first and second pre-combustion and main combustion chambers, and a second embodiment of a new and improved dual-level rotary valve mechanism incorporated therein and illustrated at its OPEN position, wherein, however, the second embodiment dual-level rotary valve mechanism provides for the simultaneous introduction of an air-fuel mixture into both of the first and second pre-combustion and main combustion chambers of the dual-level combustion chamber system, as well as for the simultaneous discharge of exhaust gases or combustion products out from both of the first and second pre-combustion and main combustion chambers of the dual-level combustion chamber system;

FIG. 9 is a schematic bottom plan view, similar to that of FIG. 4, showing, however, the second embodiment of the new and improved dual-level combustion chamber system, as disclosed within FIG. 8, wherein the second embodiment of the new and improved dual-level rotary valve mechanism is illustrated at its OPEN position;

FIG. 10 is a schematic side elevational view, similar to that of FIG. 1, showing, however, the second embodiment of the new and improved dual-level rotary valve mechanism at its OPEN position;

DETAILED DESCRIPTION OF THE PREFERRED EMBODIMENT

Figure 11:
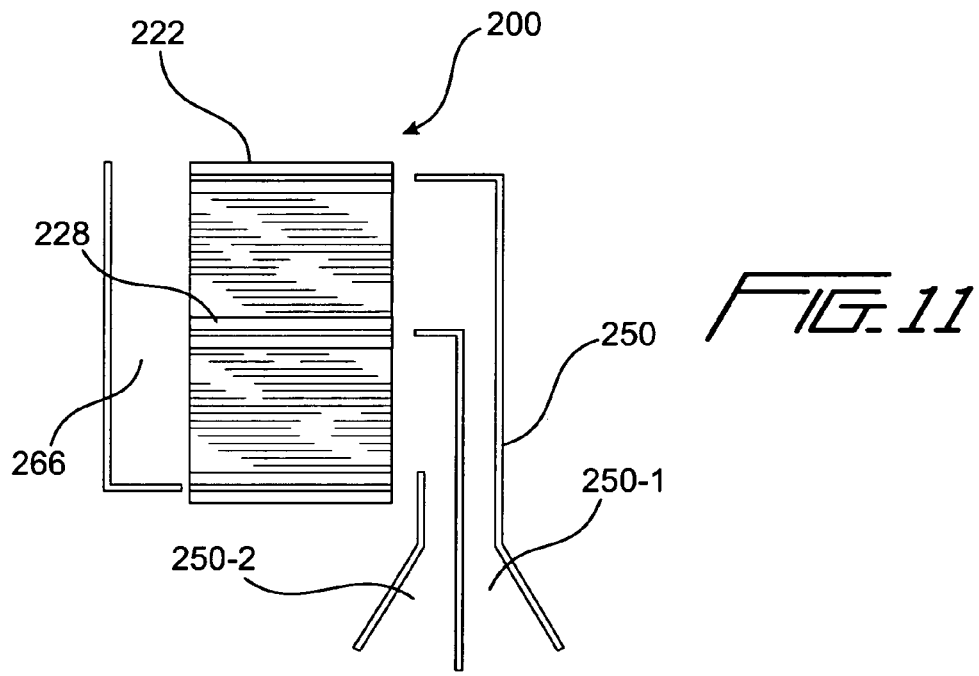
FIG. 11 is a schematic side elevational view, similar to that of FIG. 5, showing, however, the second embodiment of the new and improved dual-level rotary valve mechanism at its CLOSED position.

Referring now to the drawings, and more particularly to FIGS. 1-4 thereof, a first embodiment of a new and improved dual-level combustion chamber system, as constructed in accordance with the principles and teachings of the present invention, is disclosed and is generally indicated by the reference character 100. More particularly, it is seen that the first embodiment of the new and improved dual-level combustion chamber system 100 comprises a first, upper, pre-combustion chamber 102, and a second, lower, main combustion chamber 104, which are effectively defined within an upper substantially cylindrical section 106 of a substantially cylindrical housing 107. A power piston 108 is reciprocally movable within a lower substantially cylindrical section 109 of the substantially cylindrical housing 107, and it is seen that a driver blade or similar structure 110 is fixedly attached to the underside portion of the power piston 108 in order to drive, for example, a fastener, not shown, out from, for example, a fastener-driving tool, also not shown, within which the combustion chamber system 100 is incorporated, when a combustion firing cycle is initiated within the combustion chamber system 100. Still further, it is seen that a vertically oriented, substantially cylindrical solid post or column 112 is fixedly secured at a substantially central or axial position within the upper section 106 of the substantially cylindrical housing 107 as a result of, for example, being integrally connected to the upper wall member 114 of the upper housing section 106, and it is also seen that a substantially annular plate member 116 annularly surrounds the vertically oriented post or column 112.

The substantially annular plate member 116 is integrally connected at its radially inner peripheral edge portion to the outer peripheral portion of the centrally located post or column 112, and its radially outer peripheral edge portion is integrally connected in a similar manner to the inner peripheral wall portion of the upper housing section 106. It can therefore be appreciated that the annular plate member 116, along with the upper housing section 106 and the substantially centrally or axially located post or column 112, effectively divides the interior portion of the upper housing section 106 into the first, upper, pre-combustion chamber 102 and the second, lower, main combustion chamber 104. A spark plug or other similar combustion ignition device or mechanism 118 is mounted within the upper wall member 114 of the upper housing section 106 so as to be located within the first, upper, pre-combustion chamber 102, and it is also seen that a plurality of through-holes or apertures 120 are defined within radially outer peripheral regions of the substantially annular plate member 116 so as to fluidically interconnect the first, upper, pre-combustion chamber 102 and the second, lower, main combustion chamber 104. The plurality of through-bores or apertures 120 are also seen to be disposed within a circumferential array extending around the substantially annular plate member 116 and throughout the circumferential extents of the first, upper, pre-combustion chamber 102 and the second, lower, main combustion chamber 104 for purposes which will be explained more fully hereinafter.

With reference continuing to be made to FIGS. 1-4, and with reference also being made to FIGS. 5-7, it is further seen that a dual-level rotary valve mechanism 122 is rotatably mounted within a side wall portion the upper section 106 of the cylindrical housing 107 so as to effectively be disposed substantially diametrically opposite the angular position at which the spark plug or other combustion ignition device 118 is located within the upper section 106 of the cylindrical housing 107. More particularly, it is seen that the dual-level rotary valve mechanism 122 comprises a first upper plate member 124 having a substantially circular disk-type configuration, a second lower plate member 126 having a similar circular disk-type configuration, and a third plate member 128, having a substantially semi-circular disk-type configuration and a thickness dimension which is substantially the same as that of the substantially annular plate member 116. The third plate member 128 is interposed between the upper and lower plate members 124,126 so as to be located at an intermediate position which is substantially equally spaced from the upper and lower plate members 124,126, and the substantially annular plate member 116 has a cut-out region 129 which effectively accommodates the intermediate plate member 128. A vertically oriented partition wall 130 is interposed between the upper and lower plate members 124,126 and extends substantially diametrically across the rotary valve mechanism 122, and it is further seen that the intermediate plate member 128 is integrally connected to only one side surface portion of the vertically oriented partition wall 130. In this manner, it can readily be appreciated that the side of the rotary valve mechanism 122, upon which the intermediate plate 128 is integrally connected to the vertically oriented partition wall 130, is effectively divided into upper and lower chambers 132,134, while the opposite side of the rotary valve mechanism 122, upon which an intermediate wall member is not mounted, defines a single chamber or passage 136 which effectively extends the full height of the rotary valve mechanism 122 as defined between the upper and lower plate members 124,126.

In addition, it is also seen that one side edge portion of a semi-cylindrical housing section 138 is fixedly connected to a first side wall portion 140 of the upper section 106 of the cylindrical housing 107, while an opposite side edge portion 142 of the semi-cylindrical housing section 138 is spaced from a second side wall portion 144 of the upper section 106 of the cylindrical housing 107. Still further, it can be appreciated that the semi-cylindrical housing section 138 effectively forms a recessed pocket structure within which the rotary valve mechanism 122 is rotatably housed such that the rotary valve mechanism 122 projects or extends slightly less than halfway into the upper section 106 of the cylindrical housing 107 as a result of which, while radially outer surface portions of the rotary valve mechanism 122 are disposed in a substantially sealed manner with respect to inner surface portions of the semi-cylindrical housing section 138, radially inner surface portions of the rotary valve mechanism 138 are disposed in a substantially sealed manner with respect to outer surface portions of the centrally located post or column 112. Accordingly, when the rotary valve mechanism 122 is disposed at its OPEN position, as can best be appreciated from FIGS. 3 and 4, a fluid inlet port 146 is effectively formed by means of which an air/fuel mixture can be conducted into the lower chamber 134 of the rotary valve mechanism 122 and the lower main combustion chamber 104, and an exhaust port 148 is similarly formed by means of which exhaust gases or combustion products can be exhausted from the upper pre-combustion chamber 102 and through the upper chamber 132 of the rotary valve mechanism 122, all as will be described in more detail hereinafter.

Having described substantially all of the structural components comprising the first embodiment of the new and improved dual-level combustion chamber system 100, including the first embodiment of the new and improved dual-level rotary valve mechanism 122 incorporated therein, a brief description of a combustion-powered, fastener-driving operational cycle will now be described. More particularly, upon completion of a combustion-powered, fastener-driving operational cycle, exhaust gases or combustion products from the completed combustion-powered, fastener-driving operational cycle must first be scavenged or purged from both the pre-combustion and main combustion chambers 102,104, and accordingly, the rotary valve mechanism 122 is moved from its CLOSED position, as illustrated within FIGS. 5-7, to its OPEN position as illustrated within FIGS. 1-4. A fluid conduit 150 is respectively connected to the aforenoted side wall portion 144 of the upper section 106 of the cylindrical housing 107 and to the side edge portion 142 of the semi-cylindrical housing section 138 so as to be capable of providing a new or fresh supply of an air/fuel mixture into the main combustion chamber 104 through means of the fluid inlet port 146. More particularly, it can be appreciated that as a result of the movement of the rotary valve mechanism 122 to its illustrated OPEN position at which the partition wall 130 is effectively disposed transversely or perpendicular to the cylindrical wall defining the upper section 106 of the cylindrical housing 107, the new or fresh supply of the air/fuel mixture will be conducted through the fluid inlet port 146, into the lower fluid chamber 134 formed within the rotary valve mechanism 122, and will subsequently encounter an arcuately configured surface portion 152 of the partition wall 130 whereby the incoming air/fuel mixture will accordingly be effectively deflected into the main combustion chamber 104.

The air/fuel mixture will then flow around the centrally located post or column 112 and through the annularly configured main combustion chamber 104 in the counterclockwise direction, as viewed and illustrated within FIG. 4, until such air/fuel mixture flows into the lower end portion of the fluid chamber 136 and encounter the oppositely disposed arcuately configured surface portion 154 of the partition wall 130. The air/fuel mixture will then flow vertically upwardly through means of the dual-level fluid chamber 136, and since the entire vertical external extent of the fluid chamber 136 is effectively blocked off or sealed by means of the semi-cylindrical housing section 138, the air/fuel mixture will be forced to flow into the pre-combustion chamber 102, the air/fuel mixture will then flow around the centrally located post or column 112 and through the annularly configured pre-combustion chamber 102 in the counterclockwise direction, as viewed and illustrated within FIG. 3, and will flow into the upper fluid chamber 132 of the rotary valve mechanism 122 whereby the air/fuel mixture will again be deflected by means of the arcuately configured surface portion 152 of the partition wall 130 so as to be deflected outwardly through the exhaust port 148. It is of course to be appreciated that as the new or fresh incoming air/fuel mixture traverses the aforenoted fluid flow path, not only will the mixing together of the air and fuel components of the air/fuel mixture be enhanced, but in addition, the exhaust gases or combustion products, generated during the previous combustion-powered fastener-driving operational cycle will be entrained therewith and will ultimately be efficiently scavenged or purged from both the pre-combustion and main combustion chambers 102, 104.

Continuing still further, after a predetermined time during which the aforenoted exhaust gas or combustion product scavenging or purging operation occurs, the rotary valve mechanism 122 will be rotatably moved from its OPEN position, as illustrated within FIGS. 1-4, to its CLOSED position as illustrated within FIGS. 5-7 so as to effectively entrap a new or fresh charge of the air/fuel mixture within both of the pre-combustion and main combustion chambers 102, 104 in preparation for the commencement of a new combustion-powered fastener-driving cycle. Accordingly, when the rotary valve mechanism 122 is in fact disposed at its CLOSED position, several additional structural features are to be noted. For example, as can best be appreciated from FIGS. 6 and 7, when the rotary valve mechanism 122 is in fact disposed at its CLOSED position, the arcuate contour or shape of the surface portion 152 of the partition wall 130 is such as to effectively match or define a continuation of the interior surface portion of the upper section 106 of the cylindrical housing 107. In addition, it is also noted that the substantially semi-circular intermediate plate 128 has a pair of apertures or through-bores 156 defined therein such that when the rotary valve mechanism 122 is in fact disposed at its CLOSED position, the through-bores or apertures 156 of the intermediate plate 128 will effectively be incorporated within the circumferential array of through-bores or apertures 120 already defined within the annular plate member 116.

Accordingly, when the new combustion-powered fastener-driving operational cycle is to be initiated, the spark plug 118 will be energized or ignited thereby igniting the air-fuel mixture disposed within the pre-combustion chamber 102. Ignition of the air/fuel mixture, disposed within the pre-combustion chamber 102, will effectively spread outwardly in opposite directions from the spark plug 118, and as a result of the disposition, and predetermined sizing, of the plurality of through-bores or apertures 120,156 defined within the annular plate member 116, which separates the pre-combustion and main combustion chambers 102,104, and within the intermediate plate 128 of the rotary valve mechanism 122, a multiplicity of jets or flame fronts will effectively be formed at each one of the through-bores or apertures 120,156 whereby each one of the formed flame fronts can, in turn, effectively respectively initiate ignition of different sections of the air/fuel mixture disposed within the main combustion chamber 104. As can therefore be readily appreciated, the flame fronts need not travel over extended distances or lengthy flow paths within and throughout the pre-combustion chamber 102, as is characteristic of conventional combustion chamber arrangements wherein, for example, the spark plug or other ignition device is disposed within an upstream end portion of the pre-combustion chamber and the single fluidic connection, between the pre-combustion chamber and the main combustion, is defined within the opposite downstream end portion of the pre-combustion chamber.

It can therefore be appreciated that as a result of the provision or formation of the multiplicity of jets or flame formed between the pre-combustion and main combustion chambers 102,104 at the multiplicity of locations which are distributed substantially evenly or equally within and throughout the annular extents of the pre-combustion and main combustion chambers 102,104, rapid combustion can be achieved, and still further, the development of peak combustion pressures within, for example, the main combustion chamber 104, is enhanced. It is noted that in order to effectively facilitate and achieve the even or uniform flow of the air-fuel mixture within and throughout the annular extent of the pre-combustion chamber 102 such that portions of the air/fuel mixture effectively reach the multiplicity of through-bores or apertures 120,156 at approximately the same time so as to substantially achieve simultaneous combustion of the air/fuel mixture portions at the multiplicity of through-bores or apertures 120,156, the diametrical sizing of the various through-bores or apertures 120, 156 can be graduated such that the through-bores or apertures 120,156, located furthest from the spark plug 118, have the largest diametrical extents.

After initiating and achieving combustion of the air/fuel mixture within the main combustion chamber 104, the generated pressures and forces act upon the power piston 108, causing the same to move downwardly within the lower substantially cylindrical section 109 of the substantially cylindrical housing 107 thereby causing, in turn, the driver blade 110 to act upon a leading fastener, not shown, disposed within the magazine section, also not shown, of the fastener-driving tool, so as to drive and discharge the leading fastener from the tool. Upon completion of the power stroke performed by means of the power piston 108, the power piston 108 will move back to its original START position as illustrated, for example, within FIG. 5. It is seen that while the driver blade 110 is fixedly secured to the underside portion of the power piston 108, an upstanding boss 158, fabricated from a suitable ferromagnetic material or the like, is fixedly secured to the upper side surface portion 159 of the power piston 108, and a magnet 160 is fixedly to an undersurface portion 162 of the centrally located post or column 112, which has been recessed as at 164, in order to fixedly retain the power piston 108 at its original START position. It is to be noted that the recessed portion 164 of the post or column 112 not only physically accommodates the upstanding boss 158, but in addition, permits, for example, the combustion gases, generated within the main combustion chamber 104, to effectively act upon substantially the entire upper surface portion of the power piston 108 in order to drive the same vertically downwardly during a power stroke for driving and discharging a fastener outwardly from the combustion-powered fastener-driving tool. After completion of the combustion phase of the tool firing cycle, and after completion of the power stroke of the power piston 108 and its return to its START position, the rotary valve mechanism 122 is again rotated to its OPEN position as illustrated within FIGS. 1-4, whereby the combustion-powered fastener-driving tool is again readied for a new fastener-driving operational cycle.

With reference now being made to FIGS. 8-11, a second embodiment of a new and improved dual-level combustion chamber system, as is also constructed in accordance with the principles and teachings of the present invention, is likewise disclosed and is generally indicated by the reference character 200. It is initially noted that in view of some basic similarities between the first and second embodiments of the dual-level combustion chamber systems 100,200, the detailed description of the second embodiment dual-level combustion chamber system 200 will be confined primarily to how the structure comprising the second embodiment dual-level combustion chamber system 200 differs from the structure comprising the first embodiment dual-level combustion chamber 100. In addition, it is also noted that components of the second embodiment dual-level combustion chamber system 200, which correspond to components of the third embodiment dual-level combustion chamber system 100, will be designated by corresponding reference characters except that they will be within the 200 series.

As can be appreciated from FIGS. 8-11, which illustrate the structure comprising the second embodiment dual-level combustion chamber system 200, as compared to, for example, FIGS. 3-5, which illustrate the structure comprising the first embodiment dual-level combustion chamber system 100, it is seen that the primary difference between the first and second embodiments of the dual-level combustion chamber systems 100,200 resides in the inflow of the new or fresh charge of the air/fuel mixture into the first and second pre-combustion and main combustion chambers 102,104 and 202,204, as well as the outflow of the new or fresh charge of the air fuel mixture from the first and second pre-combustion and main combustion chambers 102,104 and 202,204 during the scavenging or purging of the exhaust gases or combustion products from the first and second pre-combustion and main combustion chambers 102,104 and 202,204. Unlike the first embodiment dual-level combustion chamber system 100 wherein when the dual-level rotary valve mechanism 122 is disposed at its OPEN position such that the new or fresh supply of the air/fuel mixture is effectively conducted into the second main combustion chamber 104 and subsequently exhausted outwardly from the first pre-combustion chamber 102, in accordance with the principles and teachings of the second embodiment dual-level combustion chamber system 200, when the dual-level rotary valve mechanism 222 is disposed at its OPEN position, the new or fresh air/fuel mixture is simultaneously conducted into both the first and second pre-combustion and main combustion chambers 202,204 and subsequently simultaneously exhausted outwardly from both the first and second pre-combustion and main combustion chambers 202,204.

More particularly, it is seen that in lieu of the single fluid conduit 150 being utilized to conduct the new or fresh charge of the air/fuel mixture only into the single fluid inlet port 146 which is fluidically connected to the second main combustion chamber 104 through means of the lower fluid chamber 134 formed within the rotary valve mechanism 122, as is characteristic of the first embodiment dual-chamber combustion system 100, in accordance with the principles and teachings of the second embodiment dual-level combustion chamber system 200, a split, dual-level fluid conduit 250 is provided with a pair of fluid passages 250-1,250-2 wherein the downstream end portions of such fluid passages 250-1, 250-2 are respectively fluidically connected to a pair of vertically spaced fluid inlet ports 246-1,246-2 which are, in turn, fluidically connected to upper and lower fluid chambers 234-1, 234-2 that are formed upon one side of the rotary valve mechanism 222. In addition, it is likewise seen that in lieu of the single exhaust port 148 which is fluidically connected only to the first pre-combustion chamber 102 through means of the upper fluid chamber 132 that is formed within the rotary valve mechanism 122, as is characteristic of the first embodiment dual-chamber combustion system 100, in accordance with the principles and teachings of the second embodiment dual-level combustion chamber system 200, a pair of vertically spaced exhaust ports 248-1,248-2 are respectively fluidically connected to upper and lower fluid chambers 232-1, 232-2 which are formed upon the opposite side of the rotary valve mechanism 222. In this manner, it can be appreciated that each one of the first and second pre-combustion and main combustion chambers 202,204 is individually and independently supplied with its own charge of a fresh or new air/fuel mixture, and that such air/fuel mixture is individually and independently exhausted from the particular pre-combustion or main combustion chamber 202,204. Still yet further, the pair of vertically spaced exhaust ports 248-1,248-2 are fluidically connected to a common, vertically oriented exhaust conduit 266, whereby as a result of the simultaneous input and output of the air/fuel mixture into the upper and lower, first and second pre-combustion and main combustion chambers 202,204, the efficiency of the exhaust gas or combustion product scavenging or purging operation can be further enhanced. It is lastly noted that as a result of the separate inlet ports 246-1,246-2, and the separate exhaust ports 248-1, 248-2, the intermediately plate 228 of the rotary valve mechanism 222 is disposed upon both sides of the partition wall 230 and therefore has a substantially circular configuration as opposed to the substantially semi-circular configuration as was the case of intermediate plate 128 of the first embodiment combustion chamber system 100.

Figure 12:
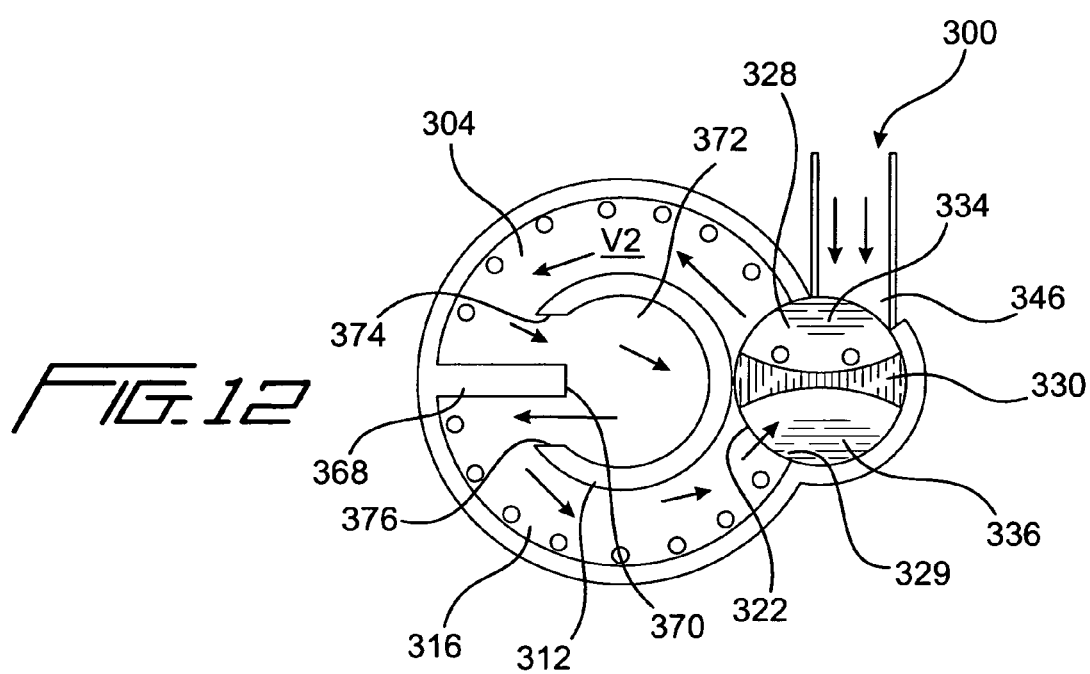
FIG. 12 is a schematic bottom plan view, similar to the schematic bottom plan view of FIG. 4, showing, however, a third embodiment of a new and improved dual-level combustion chamber system, as constructed in accordance with the principles and teachings of the present invention, comprising first and second pre-combustion and main combustion chambers, with only the main combustion chamber being illustrated, and having a new and improved dual-level rotary valve mechanism, similar to the first embodiment dual-level rotary valve mechanism, incorporated therein and illustrated at its OPEN position, wherein, however, the third embodiment of the new and improved dual-level combustion chamber system comprises internal structure, disposed within the pre-combustion chamber, which effectively defines a sinusoidal flow path along which the incoming air/fuel mixture must flow in order to be conducted into the main combustion chamber.

With reference lastly being made to FIG. 12, a third embodiment of a new and improved dual-level combustion chamber system, as is also constructed in accordance with the principles and teachings of the present invention, is likewise disclosed and is generally indicated by the reference character 300. As was the case with the second embodiment combustion chamber system 200, it is noted that in view of some basic similarities between the first and third embodiments of the dual-level combustion chamber systems 100,300, the detailed description of the third embodiment dual-level combustion chamber system 300 will be confined primarily to how the structure comprising the third embodiment dual-level combustion chamber system 300 differs from the structure comprising the first embodiment dual-level combustion chamber 100. In addition, it is also noted that components of the third embodiment dual-level combustion chamber system 300, which correspond to components of the third embodiment dual-level combustion chamber system 100, will be designated by corresponding reference characters except that they will be within the 300 series.

As can be appreciated from FIG. 12, which illustrates the structure comprising the second main combustion chamber 304 of the third embodiment dual-level combustion chamber system 300, as compared to, for example, FIG. 4, which illustrates the structure comprising the second main combustion chamber 104 of the first embodiment dual-level combustion chamber system 100, it is seen that the primary difference between the first and third embodiments of the dual-level combustion chamber systems 100,300 resides in the fact that the centrally located solid post or column 112 has effectively been eliminated and a centrally located tubular structure 312, having a substantially reversely oriented C-shaped configuration, is utilized in place thereof. In addition, it is noted that a vertically oriented, radially inwardly extending wall member 368 is disposed within the second main combustion chamber 304 such that the radially inner edge portion 370 of the wall member 368 extends beyond the circumferential locus defined by means of the substantially annular wall comprising the substantially C-shaped tubular structure 312 and therefore projects slightly inwardly into the open central region 372 of the C-shaped tubular structure 312. In this manner, when the dual-level rotary valve mechanism 322 is disposed at its illustrated OPEN position so as to permit incoming new or fresh air/fuel mixtures to enter the main combustion chamber 304 through means of the inlet port 346 and valve chamber 334, in lieu of the air/fuel mixture simply flowing around the centrally located tubular structure 312 and out the chamber 336 defined within the rotary valve mechanism 322, the incoming air/fuel mixture will encounter the radially inwardly extending wall member 368, the flow direction of the air/fuel mixture will therefore be altered from its original annular flow path so that the air/fuel mixture will now flow around a first edge portion 374 of the tubular structure 312, the air/fuel mixture will then enter the central region 372 of the tubular structure 312, the air-fuel mixture will then effectively flow around the radially inner edge portion 370 of the radially inwardly extending wall member 368, and lastly, the air/fuel mixture will flow around the opposite edge portion 376 of the tubular structure 312 so as to ultimately resume its annular flow path toward chamber 336 defined within the rotary valve mechanism 322.

It can therefore be appreciated still further that, as a result of the aforenoted sinusoidal flow path of the air fuel mixture, comprising, in effect, three additional turns or deflections in the air/fuel mixture flow path as defined by means of the tubular structure 312 and the radially inwardly extending wall member 368 disposed internally within the second main combustion chamber 304 of the third embodiment dual-level combustion chamber system 300, enhanced mixing of the air and fuel components comprising the air/fuel mixture is effectively achieved as compared to the air/fuel mixture undergoing a simple annular flow path as was characteristic of the structure comprising the first embodiment dual-level combustion chamber system 100. While the aforenoted structure has of course been noted in connection with the main combustion chamber 304, similar structure can of course also be incorporated within the pre-combustion chamber 302.

Thus, it may be seen that in accordance with the principles and teachings of the present invention, there has been provided a new and improved combustion chamber system, for use in connection with internal combustion powered fastener-driving tools, which comprises a dual-level combustion chamber comprising first and second pre-combustion and main combustion chambers which are disposed within a vertical array and which are fluidically connected together. A dual-level rotary valve mechanism which is operatively connected to the dual-level combustion chamber so as to respectively control the intake or ingress of the air/fuel mixture into one or both of the first and second pre-combustion and main combustion chambers, as well as the egress, scavenging or purging of the exhaust gases or combustion products from one or both of the first and second pre-combustion and main combustion chambers. The structural configuration of the dual-level rotary valve mechanism, in conjunction with the internal structure comprising the dual-level combustion chamber of the power tool, causes elongated, curved or arcuate flow paths to be defined or formed internally within the dual-level combustion chamber of the power tool, and the first and second pre-combustion and main combustion chambers of the combustion chamber system are also effectively separated by means of a plate having a plurality of apertures defined therein. In this manner, multiple jets or flame fronts are effectively defined within a circumferential manner throughout the combustion chamber system of the present invention which enhances the combustion distribution and the development of peak pressure values.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A dual-level combustion chamber system, comprising:
   a dual-level combustion chamber comprising first and second vertically-stacked combustion chambers; and
   a dual-level, two position valve operatively associated with said dual-level combustion chamber for controlling the ingress of an air/fuel mixture into said first and second combustion chambers and the egress of combustion products out from said first and second combustion chambers;
   wherein said dual-level valve comprises a single dual-level, two position rotary valve rotatably mounted upon said dual-level combustion chamber for movement between first OPENED and second CLOSED positions, a vertical partition, a semi-circular horizontally oriented plate disposed upon one side of said vertical partition so as to define and fluidically separate an inlet port, for permitting the ingress of the air/fuel mixture into said first combustion chamber, from an outlet port for permitting the egress of the combustion products out from said second combustion chamber, while an opposite side of said vertical partition defines a vertically oriented fluid passageway fluidically connecting said first and second combustion chambers,
   whereby when said dual-level rotary valve is disposed at said first OPENED position, an air/fuel mixture can enter said inlet port, traverse said first combustion chamber, traverse said vertically oriented fluid passageway, traverse said second combustion chamber, and exit said second combustion chamber through said outlet port so as to scavenge combustion products from said combustion chamber system which were generated during a combustion cycle, whereas when said dual-level rotary valve is disposed at said second CLOSED position, an air/fuel mixture is trapped within said first and second combustion chambers so as to be ready for a combustion cycle.

2. The dual-level combustion chamber system as set forth in claim 1, wherein:
   said first and second combustion chambers comprise first pre-combustion and second main combustion chambers.

3. The dual-level combustion chamber system as set forth in claim 2, further comprising:
   an ignition device disposed within said first pre-combustion chamber for initiating ignition within said first pre-combustion chamber.

4. The dual-level combustion chamber system as set forth in claim 3, further comprising:
   a plate interposed between and separating said first pre-combustion chamber from said second main combustion chamber; and
   a plurality of apertures defined within said plate for defining a plurality of flame fronts for initiating combustion of the air/fuel mixture at a plurality of locations within said second main combustion chamber after said ignition device has initiated combustion of the air/fuel mixture within said first pre-combustion chamber.

5. The dual-level combustion chamber system as set forth in claim 1, further comprising:
   a vertically extending cylindrical column is disposed within said dual-level combustion chamber such that flow paths are defined within said first and second combustion chambers, along which the air/fuel mixture flows throughout said first and second combustion chambers, so as to have substantially annular configurations.

6. The dual-level combustion chamber system as set forth in claim 1, further comprising:
   a vertically extending tubular column, open at one circumferential portion thereof, is disposed within said dual-level combustion chamber; and
   a vertically extending, radially inwardly projecting wall member is also disposed within said dual-level combustion chamber adjacent to said open portion of said vertically extending tubular column such that flow paths are defined within said first and second combustion chambers, along which the air/fuel mixture flows throughout said first and second combustion chambers, so as to have substantially sinusoidal configurations.

7. The dual-level combustion chamber system as set forth in claim 6, wherein:
   a radially innermost portion of said vertically extending, radially inwardly projecting wall member projects into said open circumferential portion of said vertically extending tubular column so as to fluidically cooperate with said vertically extending tubular column in defining said sinusoidal flow paths of the air/fuel mixture through said first and second combustion chambers.

8. A dual-level combustion chamber system comprising:
   a dual-level combustion chamber comprising first and second vertically-stacked combustion chambers; and
   a dual-level, two position valve operatively associated with said dual-level combustion chamber for controlling the ingress of an air/fuel mixture into said first and second combustion chambers and the egress of combustion products out from said first and second combustion chambers;

wherein said dual-level valve comprises a single dual-level, two position rotary valve rotatably mounted upon said dual-level combustion chamber for movement between first OPENED and second CLOSED positions, a vertical partition, a circular horizontally oriented plate mounted upon said vertical partition so as to be disposed upon both sides of said vertical partition and thereby define and fluidically separate a pair of inlet ports, for permitting the ingress of the air/fuel mixture into both of said first and second combustion chambers, from a pair of outlet ports for permitting the egress of the combustion products out from both of said first and second combustion chambers, whereby when said dual-level rotary valve is disposed at said first OPENED position, an air/fuel mixture can enter both of said inlet ports, traverse both of said first and second combustion chambers, and exit said first and second combustion chambers through said outlet ports so as to scavenge combustion products from said first and second combustion chamber system which were generated during a combustion cycle, whereas when said dual-level rotary valve is disposed at said second CLOSED position, an air/fuel mixture is trapped within said first and second combustion chambers so as to be ready for a combustion cycle.

9. The dual-level combustion chamber system as set forth in claim 8, wherein:
said ingress of the air/fuel mixture into both of said first and second combustion chambers, and the egress of the combustion products out from both of said first and second combustion chambers, is performed individually.

10. The dual-level combustion chamber system as set forth in claim 8, wherein:
said ingress of the air/fuel mixture into both of said first and second combustion chambers, and the egress of the combustion products out from both of said first and second combustion chambers, is performed independently.

11. The dual-level combustion chamber system as set forth in claim 8, wherein:
the ingress of the air/fuel mixture into both of said first and second combustion chambers, and the egress of the combustion products out from both of said first and second combustion chambers, is performed simultaneously.

12. A combustion-powered fastener-driving tool, comprising:
a power piston movable through a power stroke from a START position;
a driver blade fixedly mounted upon said power piston for driving a fastener out from said combustion-powered fastener-driving tool;
a dual-level combustion chamber, comprising first and second vertically stacked combustion chambers, operatively associated with said power piston for driving said power piston during a combustion cycle; and
a dual-level, two-position valve operatively associated with said dual-level combustion chamber for controlling the ingress of an air/fuel mixture into said first and second combustion chambers and the egress of combustion products out from said first and second combustion chambers;
wherein said dual-level valve comprises a single dual-level, two-position rotary valve rotatably mounted upon said dual-level combustion chamber for movement between first OPENED and second CLOSED positions, a vertical partition, a semi-circular horizontally oriented plate disposed upon one side of said vertical partition so as to define and fluidically separate an inlet port, for permitting the ingress of the air/fuel mixture in-to said first combustion chamber, from an outlet port for permitting the egress of the combustion products out from said second combustion chambers, while an opposite side of said vertical partition defines a vertically oriented fluid passageway fluidically connecting said first and second combustion chambers, whereby when said dual-level rotary valve is disposed at said first OPENED position, an air/fuel mixture can enter said inlet port, traverse said first combustion chamber, traverse said vertically oriented fluid passageway, traverse said second combustion chamber, and exit said second combustion chamber through said outlet port so as to scavenge combustion products from said combustion chamber system which were generated during a combustion cycle, whereas when said dual-level rotary valve is disposed at said second CLOSED position, an air/fuel mixture is trapped within said first and second combustion chambers so as to be ready for a combustion cycle.

13. The combustion-powered fastener-driving tool as set forth in claim 12, further comprising:
a magnetic device is disposed within one of said first and second combustion chambers for retaining said power piston at said START position prior to the commencement of a combustion power operational cycle.

14. A dual-level valve mechanism for use in connection with a dual-level combustion chamber system, comprising:
a dual-level combustion chamber comprising first and second vertically stacked combustion chambers; and
a dual-level two-position valve operatively associated with said dual-level combustion chamber for controlling the ingress of an air/fuel mixture into said first and second combustion chambers and the egress of combustion products out from said first and second combustion chambers;
wherein said dual-level valve comprises a single dual-level, two position rotary valve rotatably mounted upon said dual-level combustion chamber for movement between first OPENED and second CLOSED positions, a vertical partition, a semi-circular horizontally oriented plate disposed upon one side of said vertical partition so as to define and fluidically separate an inlet port, for permitting the ingress of the air/fuel mixture into said first combustion chamber, from an outlet port for permitting the egress of the combustion products out from said second combustion chamber, while an opposite side of said vertical partition defines a vertically oriented fluid passageway fluidically connecting said first and second combustion chambers, whereby when said dual-level rotary valve is disposed at said first OPENED position, an air/fuel mixture can enter said inlet port, traverse said first combustion chamber, traverse said vertically oriented fluid passageway, traverse said second combustion chamber, and exit said second combustion chamber through said outlet port so as to scavenge combustion products from said combustion chamber system which were generated during a combustion cycle, whereas when said dual-level rotary valve is disposed at said second CLOSED position, an air/fuel mixture is trapped within said first and second combustion chambers so as to be ready for a combustion cycle.

15. A dual-level valve mechanism for use in connection with a dual-level combustion chamber system, comprising:
a dual-level combustion chamber comprising first and second vertically-stacked combustion chambers; and a dual-level, two position valve operatively associated with said dual-level combustion chamber for controlling the ingress of an air/fuel mixture into said first and second combustion chambers and the egress of combustion products out from said first and second combustion chambers;

wherein said dual-level valve comprises a single dual-level, two position rotary valve rotatably mounted upon said dual-level combustion chamber for movement between first OPENED and second CLOSED positions, a vertical partition, a circular horizontally oriented plate mounted upon said vertical partition so as to be disposed upon both sides of said vertical partition and thereby define and fluidically separate a pair of inlet ports, for permitting the ingress of the air/fuel mixture into both of said first and second combustion chambers, from a pair of outlet ports for permitting the egress of the combustion products out from both of said first and second combustion chambers, whereby when said dual-level rotary valve is disposed at said first OPENED position, an air/fuel mixture can enter both of said inlet ports, traverse both of said first and second combustion chambers, and exit said first and second combustion chambers through said outlet ports so as to scavenge combustion products from said first and second combustion chamber system which were generated during a combustion cycle, whereas when said dual-level rotary valve is disposed at said second CLOSED position, an air/fuel mixture is trapped within said first and second combustion chambers so as to be ready for a combustion cycle.

16. The dual-level valve mechanism as set forth in claim 15, wherein:
said ingress of the air/fuel mixture into both of said first and second combustion chambers, and the egress of the combustion products out from both of said first and second combustion chambers, is performed simultaneously.

17. The dual-level valve mechanism as set forth in claim 15, wherein:
said ingress of the air/fuel mixture into both of said first and second combustion chambers, and the egress of the combustion products out from both of said first and second combustion chambers, is performed individually.

18. The dual-level valve mechanism as set forth in claim 15, wherein:
said ingress of the air/fuel mixture into both of said first and second combustion chambers, and the egress of the combustion products out from both of said first and second combustion chambers, is performed independently.

\* \* \* \* \*